United States Patent
Oestlien et al.

(10) Patent No.: US 11,715,165 B2
(45) Date of Patent: Aug. 1, 2023

(54) FACILITATING FOLLOWING A CONTENT PROVIDER

(71) Applicant: Google LLC, Mountain View, CA (US)

(72) Inventors: Christian Oestlien, New York, NY (US); Cinthya Rossana Urasaki, New York, NY (US); Rafael M. Borges, Belo Horizonte (BR); Richard D. Borovoy, Boston, MA (US); Marcus A. Leal, Belo Horizonte (BR); Julia H. Farago, Somerville, MA (US); Fred Bertsch, Belmont, CA (US); Elena Kon, San Francisco, CA (US)

(73) Assignee: Google LLC, Mountain View, CA (US)

( * ) Notice: Subject to any disclaimer, the term of this patent is extended or adjusted under 35 U.S.C. 154(b) by 255 days.

(21) Appl. No.: 17/161,050

(22) Filed: Jan. 28, 2021

(65) Prior Publication Data
US 2021/0150636 A1    May 20, 2021

Related U.S. Application Data

(63) Continuation of application No. 16/262,136, filed on Jan. 30, 2019, now abandoned, which is a
(Continued)

(51) Int. Cl.
*G06Q 30/00*    (2023.01)
*G06Q 50/00*    (2012.01)
(Continued)

(52) U.S. Cl.
CPC ......... *G06Q 50/01* (2013.01); *G06Q 30/0241* (2013.01); *G06Q 30/08* (2013.01)

(58) Field of Classification Search
CPC ..... G06Q 50/01; G06Q 30/0241; G06Q 30/08
See application file for complete search history.

(56) References Cited

U.S. PATENT DOCUMENTS

2007/0121843 A1    5/2007  Atazky et al.
2009/0182589 A1*   7/2009  Kendall ............... H04L 67/125
                                                705/26.1
(Continued)

FOREIGN PATENT DOCUMENTS

| KR | 10-2010-0093467 | 8/2010 |
| KR | 10-2011-0112688 | 10/2011 |
| WO | WO 2010-099632  | 9/2010 |

OTHER PUBLICATIONS

Determining a Level of Importance of an Entity An IP.com Prior Art Database Technical Disclosure Authors et. al.: Disclosed Anonymously IP.com No. IPCOM000198123D (Year: 2010).*
(Continued)

*Primary Examiner* — Sun M Li
(74) *Attorney, Agent, or Firm* — Fish & Richardson P.C.

(57) ABSTRACT

Methods, systems, and apparatus, including computer programs encoded on a computer storage medium, are provided for facilitating a following of a content sponsor in a social network. In one aspect, a method includes the actions of identifying a creative for presentation to users in response to requests for content, and receiving selection criteria from a sponsor associated with the creative, the selection criteria for use in determining when to present the creative. The creative is augmented to include a control that enables a user to follow the content sponsor automatically upon interaction with the control, and the augmented creative is presented in response to received requests for content in accordance with the selection criteria. The sponsor is charged when the creative is presented and a user initiates an action to follow the sponsor in a social network.

19 Claims, 10 Drawing Sheets

Related U.S. Application Data continuation of application No. 14/055,153, filed on Oct. 16, 2013, now abandoned.

(60) Provisional application No. 61/715,782, filed on Oct. 18, 2012.

(51) Int. Cl.
  *G06Q 30/0241* (2023.01)
  *G06Q 30/08* (2012.01)

(56) References Cited

U.S. PATENT DOCUMENTS

| | | | |
|---|---|---|---|
| 2010/0057546 | A1 | 3/2010 | Wang et al. |
| 2012/0116867 | A1 | 5/2012 | Reis et al. |
| 2013/0040654 | A1* | 2/2013 | Parish ............... H04W 4/21 455/456.1 |
| 2013/0041751 | A1 | 2/2013 | Park |
| 2013/0073336 | A1* | 3/2013 | Heath ............... G06Q 30/02 705/7.29 |

OTHER PUBLICATIONS

S. Kim, B. Choi, Y. Jeong, J. Hong and J. Chung, "An architecture of augmented broadcasting service for next generation smart TV," IEEE international Symposium on Broadband Multimedia Systems and Broadcasting, 2012, pp. 1-4, doi: 10.1109/BMSB.2012.6264289. (Year: 2012).*

Identifying a Social Network User Identifier Based on a User Message An IP.com Prior Art Database Technical Disclosure Authors et. al.: Disclosed Anonymously (Year: 2010).*

B. Carminati, E. Ferrari and J. Girardi, "Trust and Share: Trusted Information Sharing in Online Social Networks," 2012 IEEE 28th International Conference on Data Engineering, Arlington, VA, USA, 2012, pp. 1281-1284, doi: 10.1109/ICDE.2012.127. (Year: 2012 ).*

Method and System for Automatically Creating Groups of Users in a Social Network based on Location Information of Users in Future An IP.com Prior Art Database Technical Disclosure, Authors et. al.: Suresh Kumar, KAshootosh Chand IP.com No. IPCOM000208825D IP.com Electronic Pub Date: Jul. 19, 2011 (Year: 2011).*

Eitzen, Ben. "Engage Your Audience With Follow by Email." Blogger Buzz [Retrieved on Aug. 29, 2012], Retrieved from the Internet <URL: http://blogger.com/2011/03/engage-your-audience-with-follow-by.html>, 1 page.

Google+. "Google+: 108, the +1 Button is Coming to Display Ads." Google Inside AdWords [Retrieved on Aug. 29, 2012], Retrieved from the Internet <URL: http://adwords.blogspot.com/2011/09/google-108-1-button-is-coming-to/html>, 2 pages.

International Preliminary Report on Patentability issued in International Application No. PCT/US2013/065224 dated Apr. 30, 2015, 10 pages.

International Search Report and Written Opinion issued in International Application No. PCT/US2013/065224 dated Jan. 28, 2014, 13 pages.

Marketing Team. "Get More Sign-Ups With the Google AdWords Communications Extension." GraphicMail Blog, Feb. 20, 2012 [Retrieved on Aug. 29, 2012]. Retrieved from the Internet <URL: http://blog.graphicmail.com/post/2012/02/20/Get-more-sign-ups-with-the>, 4 pages.

Racela, Rick. "Utilize the Facebook Like Button in Display Advertising." Word of Wire, Dec. 22, 2010 [Retrieved on Aug. 29, 2012]. Retrieved from the Internet <URL: http://wordofwire.com/article/tips/utilize-facebook-button-display-advertising>, 2 pages.

* cited by examiner

FACILITATING FOLLOWING A CONTENT PROVIDER

CROSS-REFERENCE TO RELATED APPLICATION

This application is a continuation of U.S. application Ser. No. 16/262,136, filed on Jan. 30, 2019, entitled "Facilitating Following A Content Provider," which is a continuation of U.S. Ser. No. 14/055,153, filed on Oct. 16, 2013, entitled "Facilitating Following A Content Provider," which claims priority to U.S. Provisional Application Ser. No. 61/715,782, filed on Oct. 18, 2012, entitled "Facilitating Following A Content Provider," the entire contents of which are hereby incorporated by reference.

BACKGROUND

The present specification relates to information presentation.

The Internet provides access to a wide variety of resources. For example, video and/or audio files, as well as web pages for particular subjects or particular news articles, are accessible over the Internet. Access to these resources presents opportunities for content to be provided with the resources. For example, a web page can include slots in which advertisements can be presented. These slots can be defined in the web page or defined for presentation with a web page, for example, in a pop-up window.

Content slots can be allocated to content providers through an auction. For example, advertisers can provide bids specifying amounts that the advertisers are respectively willing to pay for presentation of their advertisements ("ads"). In turn, an auction can be performed and the slots can be allocated according, among other things, to bids and/or the relevance of the proposed content to content presented on a page hosting the slot or a request that is received for the content.

Social networks may include online platforms for connecting users, and for allowing the users to exchange information and messages and to maintain and share profile pages. Upon registering with a social network, for example, a user can enter profile information, can maintain his or her profile page, can send personal and/or public messages to other users and can connect with other users. Entities may promote their social network profile through general advertisements that have their profile as a landing page.

SUMMARY

In general, computer systems can facilitate a following of a content sponsor in a social network. A widget or control may be included within or provided along with a content item (e.g., a creative) and presented on a web page to a user. Upon receiving an indication of user interaction with the widget or control, a content management system may facilitate a following of the sponsor of the content item by the user in the social network. Support may be provided for campaigns (e.g., a coordinated series of messages broadcast through various media channels) based on a cost per follower model, making it easier for campaign sponsors (such as advertisers) to budget, measure, and achieve their social marketing goals.

In general, one innovative aspect of the subject matter described in this specification can be embodied in methods that include the actions of identifying a creative for presentation to users in response to requests for content; receiving selection criteria and a bid from a sponsor associated with the creative, the selection criteria for use in determining when to present the creative, the bid being of the form of a cost per follower bid, wherein the sponsor is charged when the creative is presented and a user initiates an action to follow the sponsor in a social network; augmenting the creative to include a control that enables a user to follow the content sponsor automatically upon interaction with the control; and presenting the augmented creative in response to received requests for content in accordance with the selection criteria.

In general, another innovative aspect of the subject matter described in this specification can be embodied in methods that include the actions of identifying a creative for presentation to users in response to requests for content; presenting a user interface for managing a campaign by a content sponsor associated with the creative including receiving selection criteria for presentation of the creative and a bid; presenting a bid interface that includes bid criteria for the campaign, the bid interface including a selectable control for specifying a type of bid wherein bid types include cost per impression bids, cost per action bids and cost per follower bids; receiving a selection for the campaign indicating a cost per follower bid; responsive to received requests that satisfy the selection criteria, enabling presentation of the creative along with a control for automatically enabling a user to follow the content sponsor upon interaction with the control; receiving an indication that the user has interacted with the control and followed the content sponsor; and charging the content sponsor for presentation of the creative in response to receiving the indication in accordance with the bid.

In general, another innovative aspect of the subject matter described in this specification can be embodied in methods that include the actions of identifying a creative associated with a campaign, the campaign including selection criteria and a bid, the selection criteria used in determining when to present the creative in response to requests for content, wherein the creative includes a control to enable a user to follow a content sponsor of the creative in a social network; receiving a request for content from a user device; determining to present the creative responsive to the received request based at least in part on the selection criteria; enabling presentation of the creative in response to the received request; charging the content sponsor an amount in accordance with the bid only upon receiving an indication that the user has interacted with the control and followed the content sponsor in the social network.

In general, another innovative aspect of the subject matter described in this specification can be embodied in methods that include the actions of receiving a request for a content item to be presented to a user; identifying the content item from a plurality of content items, wherein the content item is associated with a content sponsor, and wherein the content item includes a control for receiving an account identifier for a social network associated with a viewer who interacts with the content item; providing the content item to the user, responsive to the request; receiving, through the control, the user's account identifier; and facilitating a following of the content sponsor in the social network by the user.

Other embodiments of these aspects include corresponding systems, apparatus, and computer programs, configured to perform the actions of the methods, encoded on computer storage devices.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
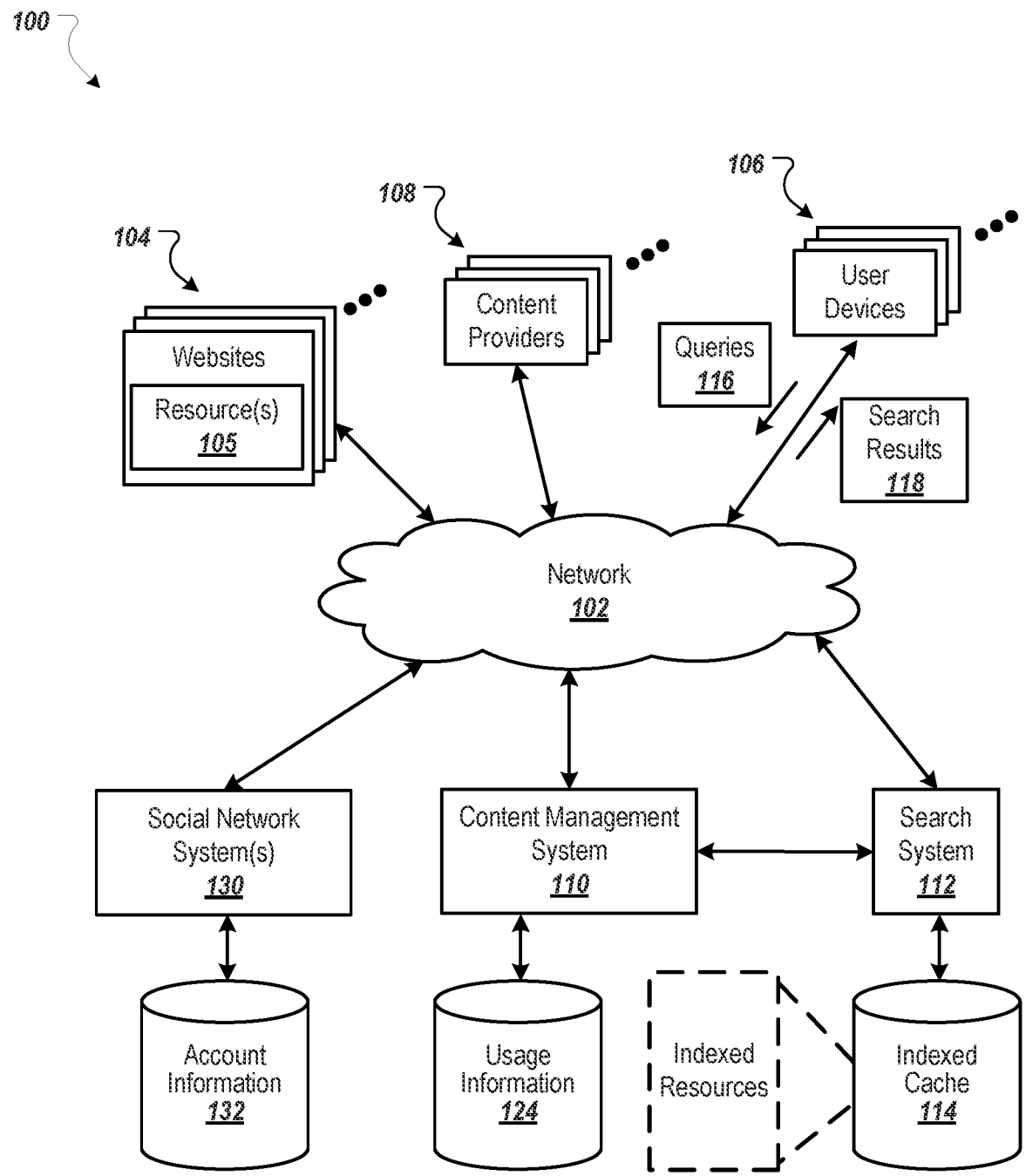
FIG. 1 is a block diagram of an example environment for presenting content to users in response to requests for content.

A content item can be presented responsive to a conventional request for content (e.g., a display ad, search result ad, etc.). The content item may include a control which enables a user to enter his or her user identifier or to otherwise provide approval, allowing the user to follow the content sponsor that is associated with the content item. In situations where the user is already logged into a social network, for example, a cookie or another form of token may be used to provide the user identifier. The information may be validated and stored by a content management system. A content sponsor may be charged for the interaction (e.g., the following after presentation of the content item). Upon following the content sponsor, for example, the user may begin receiving posts from the content sponsor on his own profile page, such as in a timeline associated with the user in a social network.

A control can be embedded on or in a creative, or rendered as an overlay. The control can allow a user to follow an advertiser's social network profile page directly by, for example, clicking on a button, without having to visit the specific profile page in a social network. The control may display social annotations related to the content sponsor's social network profile page, such as information about connected users that already follow the profile page or aggregated information (e.g., counts) about the profile followers.

The content item may be directed to users that are more likely to interact with it. For example, a user may be selected if the he is predicted to be interested in a product or service associated with the content sponsor, if he is a frequent user of a social network, if he has previously followed other content sponsors, if one or more of his social network connections have followed the content sponsor, etc. A multi-dimensional machine learning algorithm may be used to identify users who may be more likely to interact with the content item.

A user can be identified to determine whether he is already a follower of a content sponsor. Based on the determination, for example, a content item that might otherwise be shown to the user can be changed. In some implementations, a control for following may be removed from a content item presented to an existing follower, or the content item content may be changed. As another example, a bid parameter can be changed, to not bid on showing the content item to user.

A cost per follow model can be supported, where a content sponsor may be charged whenever a user interacts with (e.g., clicks on a follow button associated with a creative and starts to follow the content sponsor's social network profile page). By enabling content sponsors to track and bid on followers, for example, the content sponsors can more easily budget, measure, and achieve their social marketing goals. In general, user-related data for followers may be aggregated. For example, rather than evaluating a click-through rate, a follow-through rate may be evaluated. Tools can be provided to allow content sponsors to measure the marginal cost of acquiring a follower. Return on investment information may be provided. For example, when a content item is shown to a follower, conversions may occur more often than that of a regular user. With conversion tracking, for example, the return of a campaign targeted to followers may be computed. For example, an average follower may purchase $50 (on average) of goods or services from an online store vs. $15 (on average) of goods or services purchased by a regular user. The cost of acquiring a follower may be known (e.g., based on the bid for a cost per follower type content item), and the return that a follower may bring can be calculated. Based on such information, for example, a campaign budget may be optimized.

A follow control may be defined as an option when designing a creative. In general, content sponsors may select a template for a content item from a plurality of available templates. From the template, options may include adding text, pictures, videos, etc. A creative builder template may be prepopulated with content from a content sponsor's social network profile page, posts from page, etc. A content sponsor can use the builder to specify which social networks he wants to enable for potential user following. If a particular user is a member of multiple social networks, an option may be provided within a user interface for a user to choose which social networks to follow for the content sponsor. To determine if a content sponsor has a social network profile, the content sponsor can link their profile to one or more of their campaigns. A follow control may be displayed for content sponsors that have a social network profile page as a destination URL.

In some implementations, an auction can be used to determine which content items to provide responsive to a given request. Content items of different formats or having different pricing models may be converted to an equivalent format so that they are compared for the purposes of the auction. When a particular content item is associated with a cost per follower model, for example, it may be converted to an equivalent cost per click pricing, and it may compete in an auction.

After a user starts to follow a content sponsor, additional content may be directed to the user on web pages which receive content items from the content management system. Users may be classified into different degrees of engagement, for example. Content can be re-marketed to followers and return on investment calculated, for example, based on interactions of the user with the re-marketing content.

FIG. 1 is a block diagram of an example environment 100 for providing content to users in response to requests for content. The example environment 100 includes a network 102, such as a local area network (LAN), a wide area network (WAN), the Internet, or a combination thereof. The network 102 connects websites 104, user devices 106, content providers 108 (e.g., advertisers), publishers, one or more social network system(s) 130, and a content management system 110. The example environment 100 may include many thousands of websites 104, user devices 106, and content providers 108. The content management system 110 may be used for selecting and providing content in response to requests for content.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, images and sounds, that may include embedded information (such as meta-information hyperlinks) and/or embedded instructions (such as JavaScript scripts).

To facilitate searching of resources 105, the environment 100 can include a search system 112 that identifies the resources 105 by crawling and indexing the resources 105 provided by the content publishers on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. User devices 106 can also submit search queries 116 to the search system 112 over the network 102. A request for a resource 105 or a search query 116 sent from a user device 106 can include an identifier, such as a cookie, identifying the user of the user device 106.

In response to a search query 116, the search system 112 can access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The content information system 110 can update usage information 124 for a user, based on activity of the user, subject, for example, to the user's express permission. The user may receive notice of what data may be collected and how such data may be used or retained, and may be provided with an opportunity consent to the use of such data. In addition, certain data may be anonymized in one or more ways before it is stored or used, so that personally identifiable data is removed. The usage information 124 can include, for example, information about past user activities, such as past requests for resources 105, past search queries 116, other requests for content, websites visited, or interactions with content. In some implementations, the usage information 124 can be derived, for example, from one or more of a query log, an advertisement log, or requests for content. In some implementations, the usage information 124 can include, for each entry, a timestamp, a cookie or an IP (Internet Protocol) address associated with a requesting user device 106, a type of usage, and details associated with the usage.

When a resource 105 or search results 118 are requested by a user device 106, the content management system 110 may receive a request for content to be provided with the resource 105 or search results 118. The request for content can include characteristics of one or more "slots" that are defined for the requested resource 105 or search results page. For example, the data representing the resource 105 can include data specifying a portion of the resource 105 or a portion of a user display, such as a presentation location of a pop-up window or a slot of a third-party content site or web page or a designated portion of a user interface associated with a search control, in which content can be presented. An example slot is an ad slot. Search results pages can also include one or more slots in which other content items (e.g., ads) can be presented.

Information about slots can be provided to the content management system 110. For example, a reference (e.g., URL) to the resource for which the slot is defined, a size of the slot, and/or media types that are available for presentation in the slot can be provided to the content management system 110. Similarly, keywords or portions of keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords (or portions of keywords) or search queries 116. As another example, content items having selection keywords that match the resource keywords (or portions thereof) or the search query 116 are selected as eligible content items by the content management system 110. In some implementations, users that are members of social networks (e.g., by being logged in or otherwise designating such status) can be selected for presentation of particular content items that have selection criteria that specify that eligible viewers are members of the social networks (e.g., thereby identifying potential followers for the content sponsor).

A selection keyword can match a resource keyword or a search query 116 by having the same textual content ("text") as the resource keyword or search query 116. For example, a content item (e.g., an advertisement) associated with the selection keyword "automobiles" can be an eligible content item (or an eligible ad) for a content item request that includes the resource keyword "automobiles." Similarly, the ad can be selected as an eligible content item for a request including the search query "automobiles".

The content management system 110 can select from the eligible content items that are to be provided for presentation in slots of a resource 105 or search results page 118 based at least in part on results of an auction. For example, for the eligible content items, the content management system 110 can receive bids from content providers 108 (e.g., advertisers) and allocate the slots, based at least in part on the received bids (e.g., based on the highest effective bidders at the conclusion of the auction). The bids are amounts that the content providers are willing to pay for presentation (or selection) of their content with a resource 105 or search results page 118. For example, a bid can specify an amount that a content provider is willing to pay for each one thousand impressions (i.e., presentations) of the content item, referred to as a CPM bid. Alternatively, the bid can specify an amount that the content provider is willing to pay for a selection (i.e., a click-through) of the content item or a conversion following selection of the content item. In some implementations, the bid can specify an amount the content provider is willing to pay for a follower (e.g., of a profile page associated with the content sponsor) in a social network. The selected content item can be determined based on the bids alone, or based on the bids of each bidder being multiplied by one or more factors, such as quality scores derived from content performance, landing page scores, and/or other factors.

The content management system 110 can communicate with one or more social networks (e.g., social network system(s) 130) through the network 102. In general, social networks may include online platforms for connecting users (e.g., individuals, organizations, interest groups, etc.), and for allowing the users to exchange messages or data and to maintain and share profile pages. Users can register with one or more of the social network system(s) 130, for example, by providing a user name, a password, and other information. Upon registering, for example, a user can enter profile information (e.g., demographics, interests, photos, etc.), can maintain his or her profile page, can send personal and/or public messages to other users and can connect with (e.g., link to, subscribe to, etc.) other users. When a first user "follows" a second user, for example, a social network can associate the users, and the first user may automatically receive content (e.g., text, photos, videos, etc.) posted to the social network by the second user. Further, the first user may designate (e.g., indicate approval of, repost, comment on, etc.) the content. Social network information (e.g., profile information, connection information, message information, etc.) for registered users may be maintained by an account information data store 132, for example.

Figure 2:
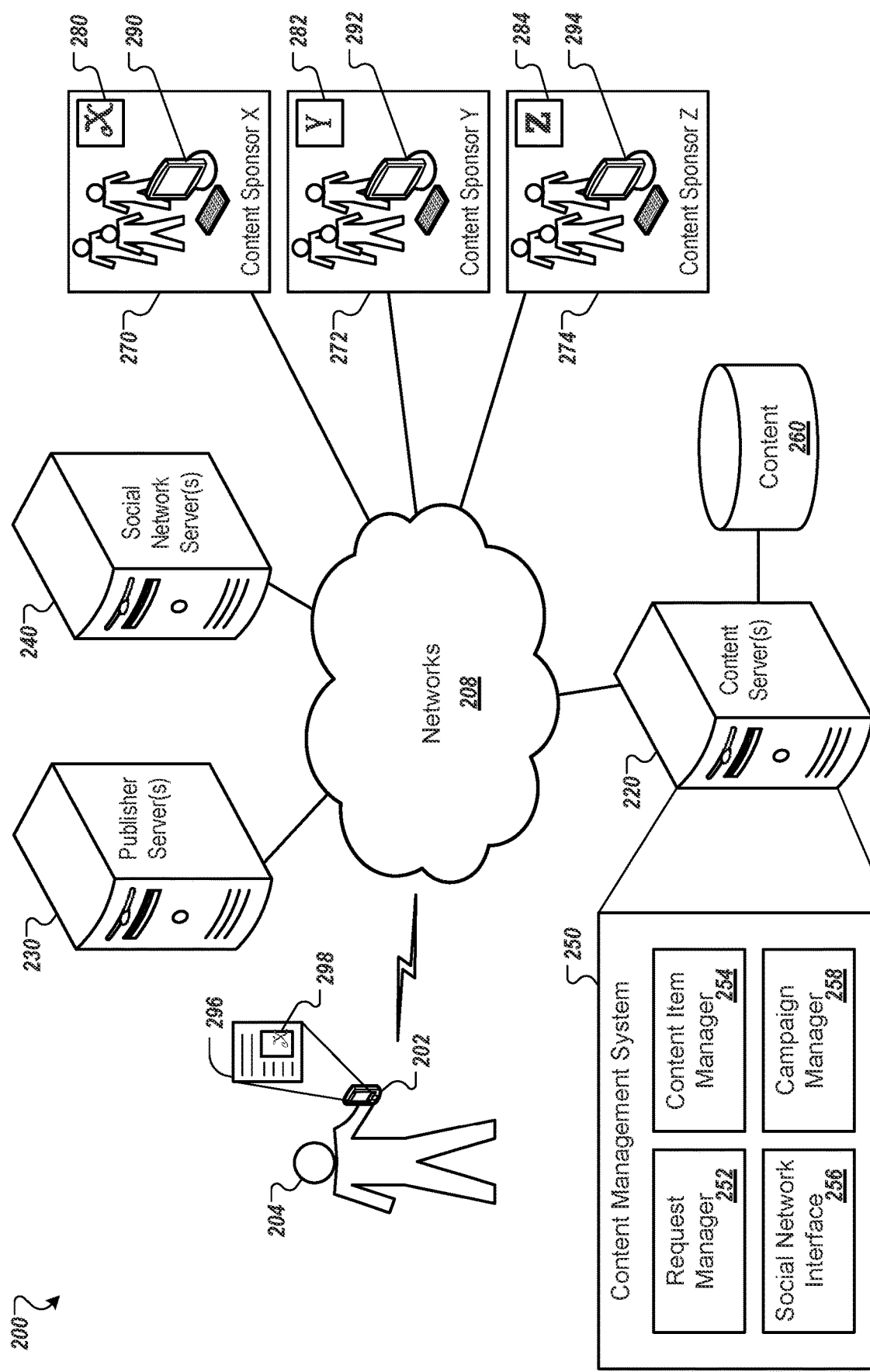
FIG. 2 is a diagram of an example system for facilitating a following of a content sponsor in a social network

FIG. 2 is a diagram of an example system 200 for facilitating a following of a content sponsor in a social network. The system 200 can include one or more client devices (e.g., client device 202) operated by corresponding users (e.g., user 204). The client device 202, for example, can communicate with one or more servers (e.g., content server 220, publisher server 230, and social network server 240) over one or more networks (e.g., network(s) 208). The network(s) 208, for example, may include a wireless cellular network, a wireless local area network (WLAN) or WiFi network, a Third Generation (3G) or Fourth Generation (4G) mobile telecommunications network, an intranet, the Internet, or any other suitable network or any appropriate combination thereof.

The client device 202 may be any suitable type of computing device (e.g., mobile phone, smartphone, personal digital assistant, tablet computer, laptop or desktop computer, or other stationary or portable device) that includes one or more processors and computer readable media. Among other components, for example, the client device 202 includes one or more processors, computer readable media that store software applications, input device(s) (e.g., touch screens, keyboards, computer mice, motion sensors, microphones, etc.), output device(s) (e.g., display screens, speakers, etc.), and communications interfaces.

The servers 220, 230, and 240 may be configured to execute application code associated with a variety of software components (e.g., modules, objects, libraries, services, etc.), including computer instructions to perform some or all of the method steps described below. The content server 220, for example, may include one or more components of a content management system 250, such as a request manager 252, a content item manager 254, a social network interface 256, and a campaign manager 258. Two or more of the components 252, 254, 256, and 258 may be implemented on the same computing device, or on different devices, such as devices included in the cloud, in a server farm, or in a peer-to-peer network. The request manager 252, for example, can handle requests (e.g., from publishers) for content items to be presented to users. The content item manager 254, for example, can handle the creation of (e.g., definition of) content items by content sponsors, and may provide an interface (e.g., a builder) for creating content items. The social network interface 256, for example, can handle communications between the content server 220 and the social network server 240. The campaign manager 258, for example, can aggregate information associated with user interactions with content items, can handle financial transactions with content sponsors, and can provide an interface (e.g., a reporting tool) for providing campaign information to the content sponsors.

The content management system 250 may be in communication with one or more data stores, servers, and/or other systems. In the present example, the content management system 250 and the content server 220 may communicate with a content data store 260, which may implement databases, file systems, or other suitable data management mechanisms to add, remove, maintain, and provide data used by the system 200.

Various content sponsors may provide content to be associated with web pages for presentation to users. In the present example a content sponsor 270 (Content Sponsor X), a content sponsor 272 (Content Sponsor Y), and a content sponsor 274 (Content Sponsor Z) may provide respective content items 280 (Content Item X), 282 (Content Item Y), and 284 (Content Item Z) to the content server 220 through the network(s) 208, for inclusion in the content data store 260. To communicate with the content management system 250 and to provide, generate, and/or define content items, for example, each content sponsor may use respective computing devices 290, 292, and 294. Using their respective computing devices, for example, Content Sponsors X, Y, and Z may each receive user interfaces from the content management system 250, such as builders which may allow the content sponsors to define their content items (e.g., advertisements) to define the intended audience for the content items, and to provide various campaign parameters (e.g., bids for an advertising auction) associated with the content items. User interfaces provided by the content management system 250, for example, may also include reporting tools for providing campaign status information, such as counts of various sorts of interactions (e.g., views, clicks, follows) associated with each content item, and return on investment information.

Content items may be provided to users along with requested web pages. When accessing a web page 296 provided by the publisher server 230, for example, the publisher server can request a content item from the content server 220. Alternatively, the web page 296 can include code snippets that when processed by a browser on a client device makes a call to the content management system 250 to retrieve relevant content items from the content server 220. The content management system 250 can retrieve one or more suitable content items from the content data store 260, for example, based on the results of an auction and/or attributes of the user 204 and/or attributes of the client device 202. In the present example, the content item 298 may be provided to the publisher server 230 or to a browser rendering a publisher page, for inclusion in the web page 296 to be presented to the user 204.

Figure 3:
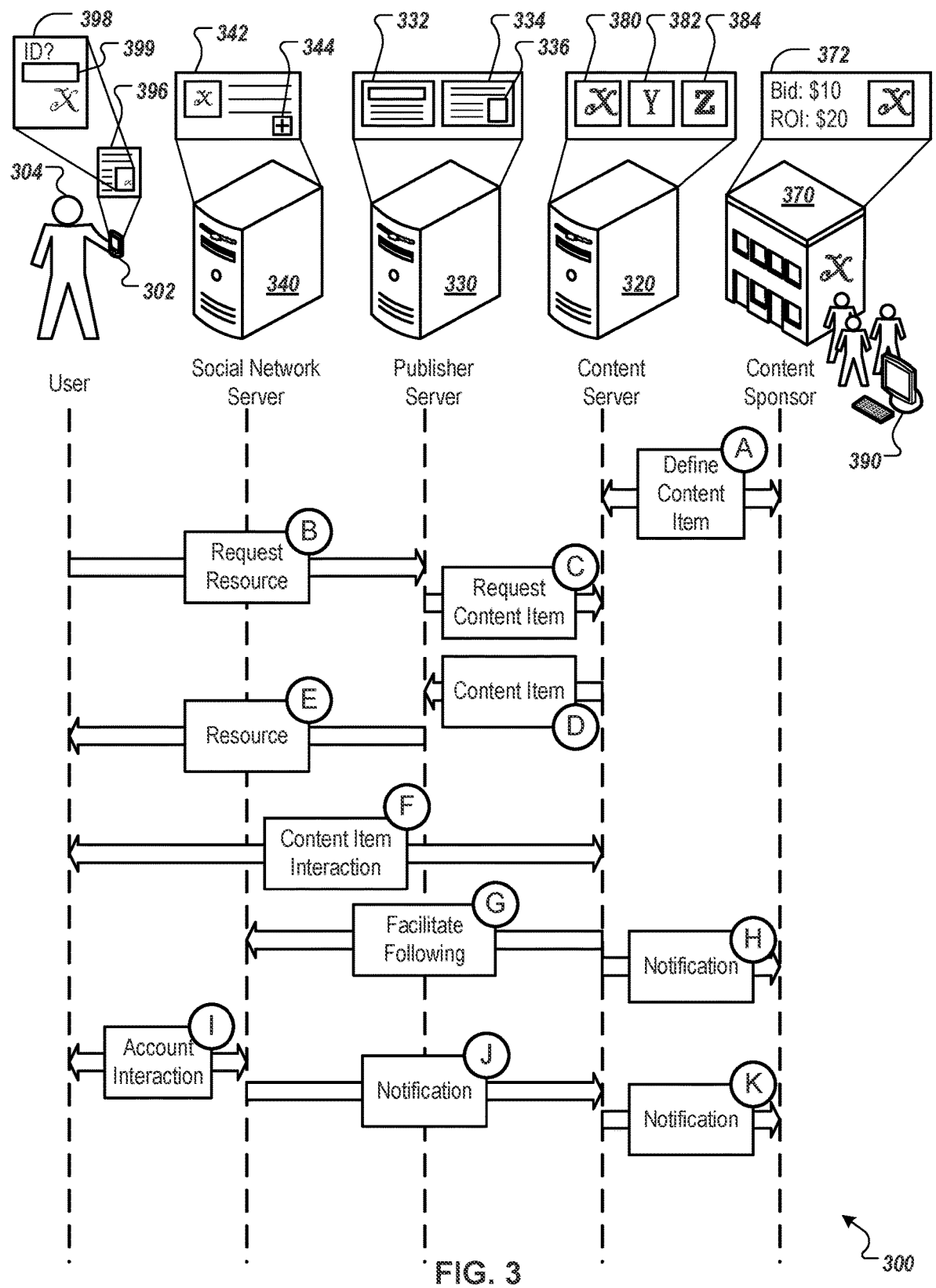
FIG. 3 is a process flow diagram illustrating an example process for facilitating a following of a content sponsor in a social network.

FIG. 3 is a process flow diagram illustrating an example process 300 for facilitating a following of a content sponsor in a social network. Various entities may participate in the process flow, including a user 304 (e.g., similar to the user 204, shown in FIG. 2) employing a client device 302 (e.g., similar to the client device 202), a social network server 340 (e.g., similar to the social network server 240), a publisher server 330 (e.g., similar to the publisher server 230), a content server 320 (e.g., similar to the content server 220), and a content sponsor 370 (e.g., similar to the content sponsor 270) employing a computing device 390 (e.g., similar to computing device 290). The stages (A) to (K) depicted in the example process 300 may occur in the illustrated sequence, or they may occur in a sequence that is different than in the illustrated sequence. For example, two or more of the stages (A) to (K), may occur concurrently.

During stage (A), the content sponsor 370 can define a content item. For example, the content sponsor 370 can use the computing device 390 to communicate with the content server 320 and to receive an interface 372 for defining a content item 380 (e.g., similar to the content item 280, shown in FIG. 2). The interface 372, for example, can also be used by the content sponsor 370 to provide a cost per follower bid associated with the content item 380, and to define the intended audience (e.g., the location and/or other attributes of users) for presentation of the content item 380. The content server 320 maintains information associated with other content items provided by the content sponsor 370, and with other content items provided by other content sponsors, such as a content item 382 (e.g., similar to the content item 282), and a content item 384 (e.g., similar to the content item 284).

During stage (B), the user 304 can use the client device 302 to request a resource from the publisher server 330. For example, the publisher server 330 may maintain various web pages (e.g., web pages 332, 334) for presentation to users. In the present example, the user 304 may request web page 334.

During stage (C), the publisher server 330 or rendering browser can request one or more content items from the content server 320. For example, the web page 334 may include a slot 336 for including a content item for presentation to a user, along with the web page. The content server 320, for example, may select the content item 380 for inclusion in the web page 334 at the slot 336, based on information provided by the content sponsor 370, and based on attributes of the user 304 and/or the client device 302.

During stage (D), the content server 320 can provide the content item 380 to the publisher server 330 or directly to the client device for presentation to the user. In some implementations, the content item is provided by a server associated with the content sponsor. Upon receiving the content item 380, for example, the publisher server 330 can include the content item in the web page 334 at the slot 336.

During stage (E), the publisher server 330 can provide the requested resource (e.g., web page 396, similar to web page 296, shown in FIG. 2) to the client device 302 for presentation to the user 304. The web page 396, for example, may be an instance of the web page 334 (including the content item 380 at the slot 336), rendered by a web browser of the client device 302. In the present example, the content item 380 (here shown as content item 398) may include a control 399 for the user 304 to provide an identifier (e.g., a user name) for his or her social networking account. As another example, the client device 302 may determine that the user is already logged into his or her social network, and may provide the control 399 as a button or other control to enable the following of the content sponsor 370 on the user's social network.

During stage (F), the user 304 can interact with the content item 398, and information associated with the interaction can be provided to the content server 320 or another content management system. For example, the user 304 can enter (e.g., type in) his or her social network account identifier. As another example, the user 304 can click a control included on the content item 398 to indicate an intent to follow the content sponsor 370 in the social network.

During stage (G), the content server 320 or content management system can facilitate a following of the content sponsor 370 by the user 304 in the social network. For example, the content server 320 can use an application programming interface (API) provided by the social network server 340 to request that the social network server update information associated with the user 302 and/or the content sponsor 370 to include the user as a follower of the content sponsor.

During stage (H), the content server 320 can provide a notification to the content sponsor 370 that one or more users have been added as followers of the content sponsor. For example, the content server 320 can provide aggregated information about the users that have chosen to follow the content sponsor 370 upon being presented with the content item 398. The content sponsor 370, for example, may review such information through the interface 372 presented on the computing device 390. The content sponsor 370 may be charged by an entity associated with the content server 320, for example, in response to receiving the indication, and in accordance with the content sponsor's bid.

During stage (I), the user 304 can interact with content associated with the content sponsor. For example, the user 304 can use the client device 302 to navigate to a web page 342 provided by the social network server 340. In the present example, the web page 342 may include a message posted to the social network by the content sponsor 370. The user 304, for example, may interact with (e.g., indicate approval of, repost or forward, post related content, etc.) the message by interacting with the control 344. As another example, the user 304 can use the client device 302 to interact with another content item (e.g., a general advertisement) provided by the publisher server 330 to navigate to the content sponsor's landing page (e.g., a virtual storefront). While visiting a landing page associated with the content sponsor 370, for example, the user 304 may perform various actions, such as exchanging messages, purchasing goods or services, etc.

During stage (J), the content server 320 can be notified of user interaction with content associated with the content sponsor. For example, the social network server 340 can notify the content server 320 that the user 302 interacted with the control 344, thus indicating approval of a message posted to the social network by the content sponsor 370. As another example, a publisher server (e.g., publisher server 330) can notify the content server 320 that the user 302 interacted with (e.g., clicked) another content item to navigate to a web page associated with the content sponsor 370.

During stage (K), the content sponsor 370 can be notified of user interaction with content associated with the content sponsor. For example, the content server 320 can provide aggregated information associated with various user actions (e.g., clicks, messages, purchases, etc.) for presentation on the computing device 390 through the interface 372. Such information, for example, may include return on investment information based on the value of user interactions with content remarketed to the user, and a cost associated with initially paying for the user to follow the content sponsor (e.g., the initial bid). In some implementations, the content sponsor 370 may be charged by an entity associated with the content server 320 for user interactions with the content sponsor (e.g., via the sponsor's social network profile page and/or other web pages) which may occur after the user has begun following the content sponsor.

Figure 4:
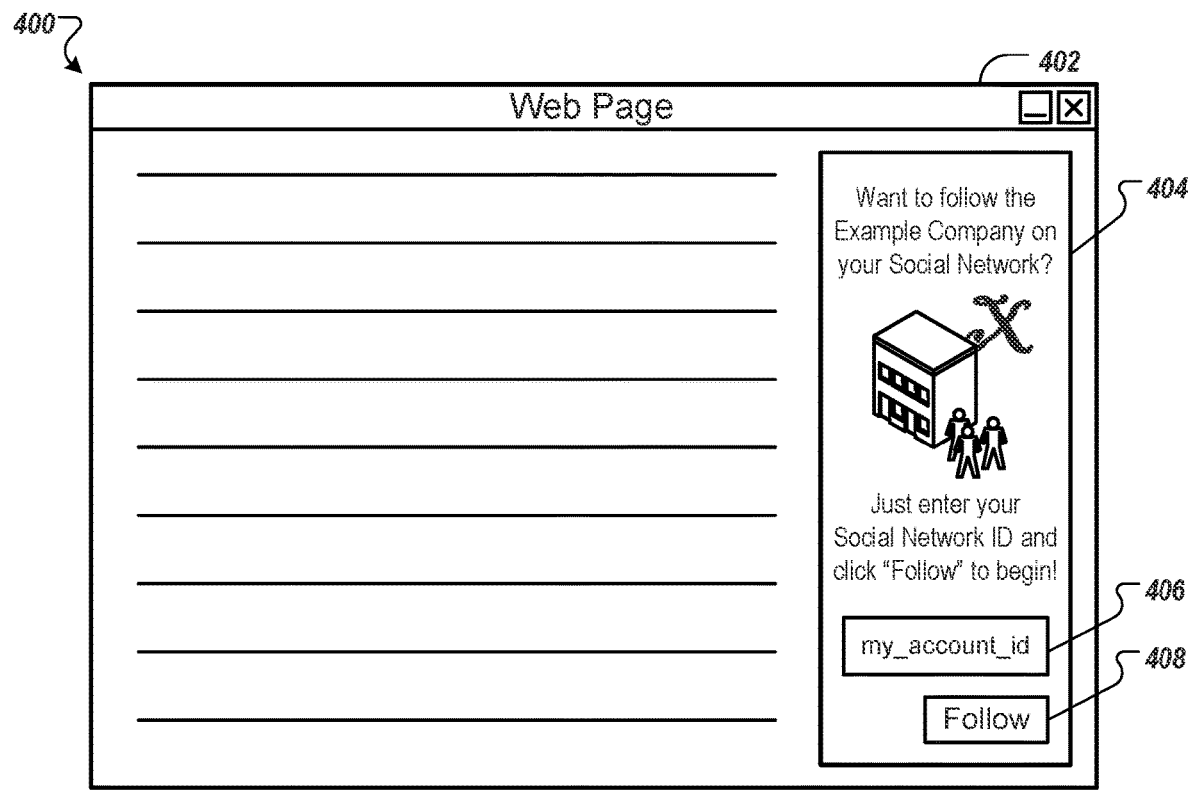
FIGS. 4-6 show example user interfaces for facilitating a following of a content sponsor in a social network.

FIG. 4 shows an example user interface 400 for facilitating a following of a content sponsor in a social network. The user interface 400, for example, may be presented to a user (e.g., user 204, shown in FIG. 2, user 304, shown in FIG. 3) by a client device (e.g., client device 202, 302). The user interface 400 in the present example can include a creative 404 displayed on a web page 402. The creative 404, for example, can include a control 406 for receiving a user's account identifier for a social network, and a control 408 for submitting the account identifier. The user interface 400, for example, may be presented to a user upon determining that the user is not logged into the social network.

Figure 5:
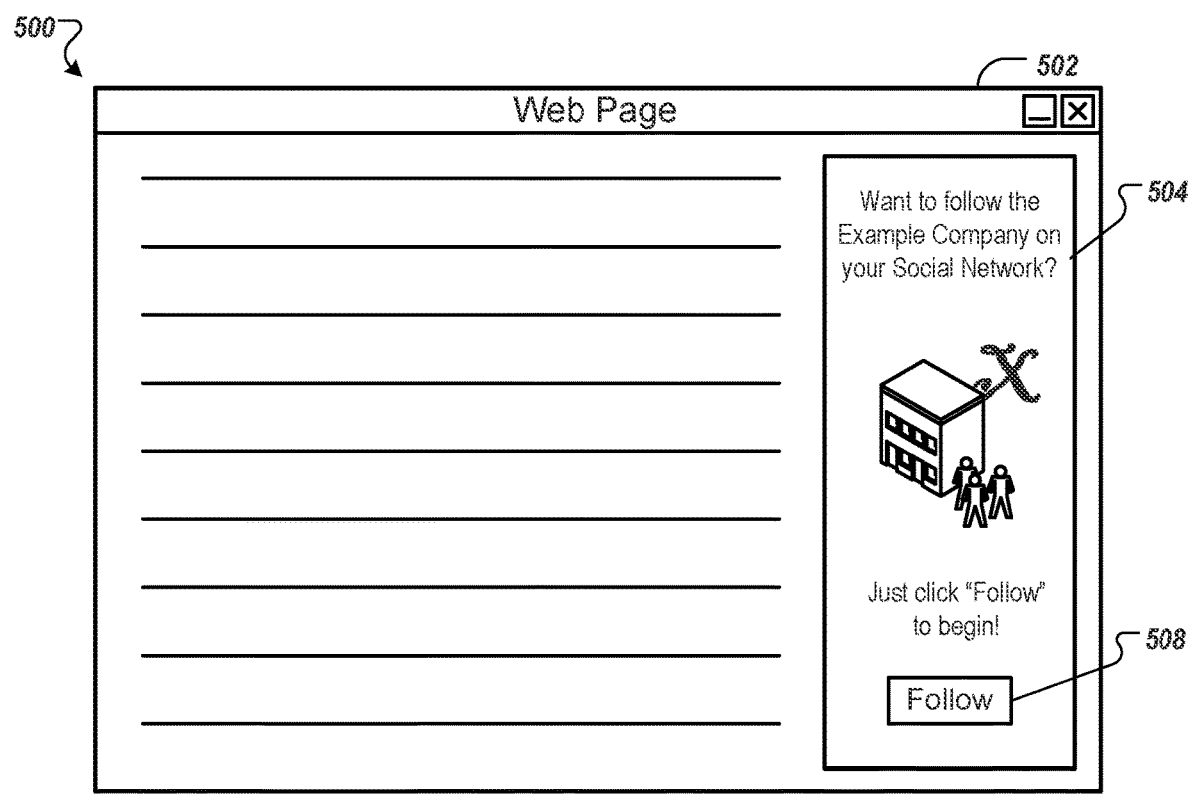

FIG. 5 shows an example user interface 500 for facilitating a following of a content sponsor in a social network. The user interface 500, for example, may be presented to a user (e.g., user 204, shown in FIG. 2, user 304, shown in FIG. 3) by a client device (e.g., client device 202, 302). The user interface 500 in the present example can include a creative 504 displayed on a web page 502. The creative 502, for example, can include a control 508 for automatically enabling a user to follow a content sponsor associated with the creative (e.g., Content Sponsor X) upon interaction with the control. The user can express an intention to follow the content sponsor, for example, by interacting with (e.g., clicking) the control 508. The user interface 500, for example, may be presented to a user upon determining that the user is logged into the social network.

Figure 6:
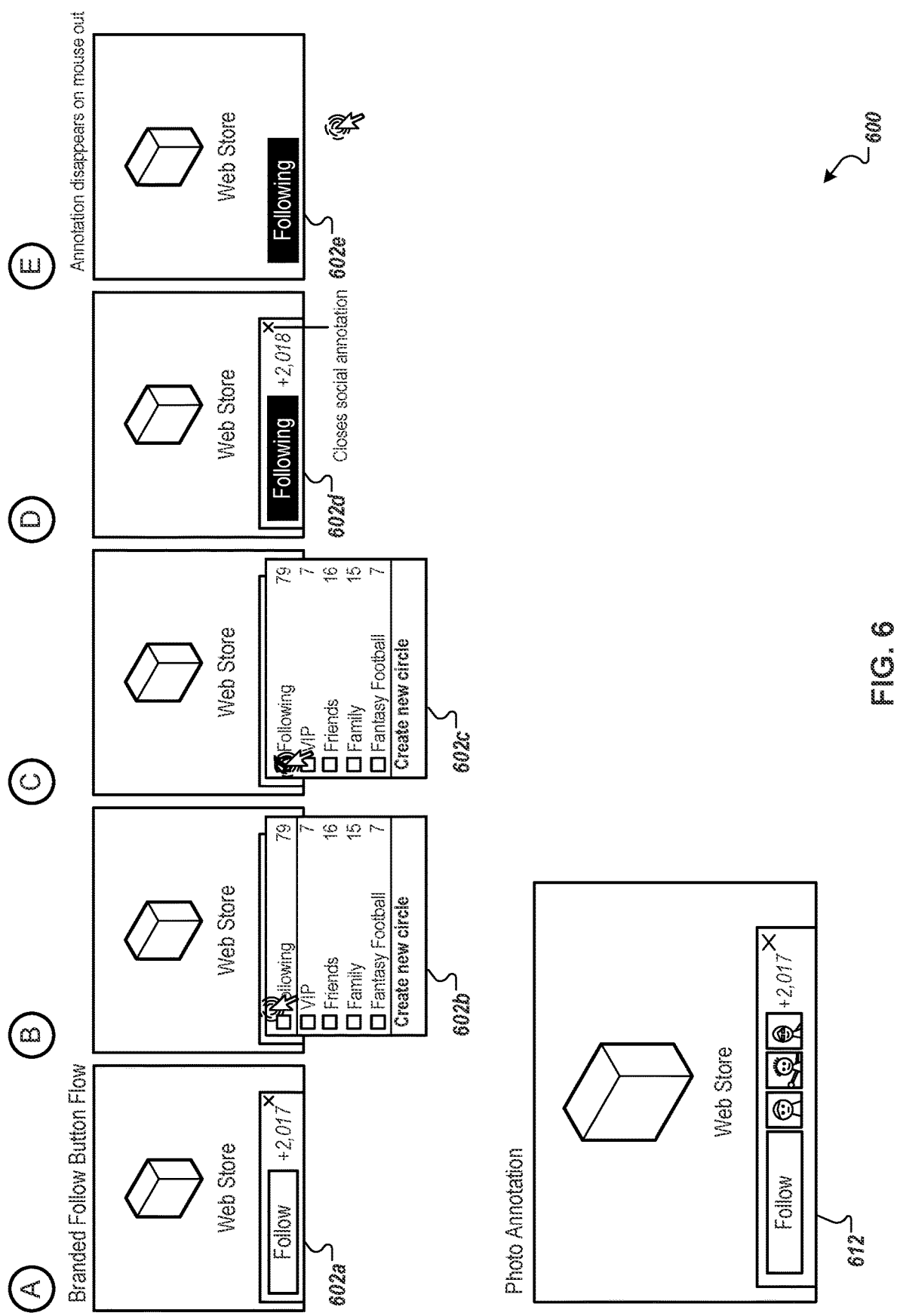

FIG. 6 shows an example user interface 600 for facilitating a following of a content sponsor in a social network. The user interface 600, for example, may be presented to a user (e.g., user 204, shown in FIG. 2; user 304, shown in FIG. 3) by a client device (e.g., client device 202, 302).

As shown in an example branded follow button flow sequence, during stage (A), a creative includes a control 602 (shown here as control 602a) for enabling the user to follow the content sponsor in the social network, and for presenting the user with information regarding his or her social network and the content sponsor. In the present example, the control 602a includes a button for the user to click if the user wants to follow the content sponsor, and a count of other users in the social network who are current followers of the content sponsor. The button for following may currently be enabled, for example, as indicated by an appropriate color.

During stage (B), the user may click the button included in the control 602 (shown here as control 602b) for following the content sponsor. Upon receiving a user click, for example, a drop-down list may be presented to the user, including one or more selections. In the present example, a default selection is presented to the user for following the content sponsor. Further, in the present example, various connection categories are presented to the user for designating the type of connection that is to occur. The control 602b may include an option for creating new connection categories (e.g., "circles").

During stage (C), the user may select a default following behavior for the content sponsor, by clicking the respective check box included in the control 602 (shown here as control 602c). The control 602c, for example, may provide an indication of the user interaction to a content server (e.g., content server 220, shown in FIG. 2; content server 330, shown in FIG. 3).

During stage (D), the control 602 (shown here as control 602d) is modified to show that the user is currently following the content sponsor in the social network. Further, an annotation associated with the control is modified to increment the count of users in the social network who are current followers of the content sponsor.

During stage (E), the control 602 (shown here as control 602e) is modified to remove the annotation, for example, as the user removes his or her selection cursor from the area of the control.

A control 612, for example, is shown with an alternate type of annotation. For example, the control 612 may include a button for the user to click if the user wants to follow the content sponsor, a count of other users in the social network who are current followers of the content sponsor, and one or more graphical representations (e.g., photos) of other users in the social network who are current followers of the content sponsor. The other users, for example, may be included in the user's social network (e.g., close connections), or may be random, unconnected users.

Figure 7:
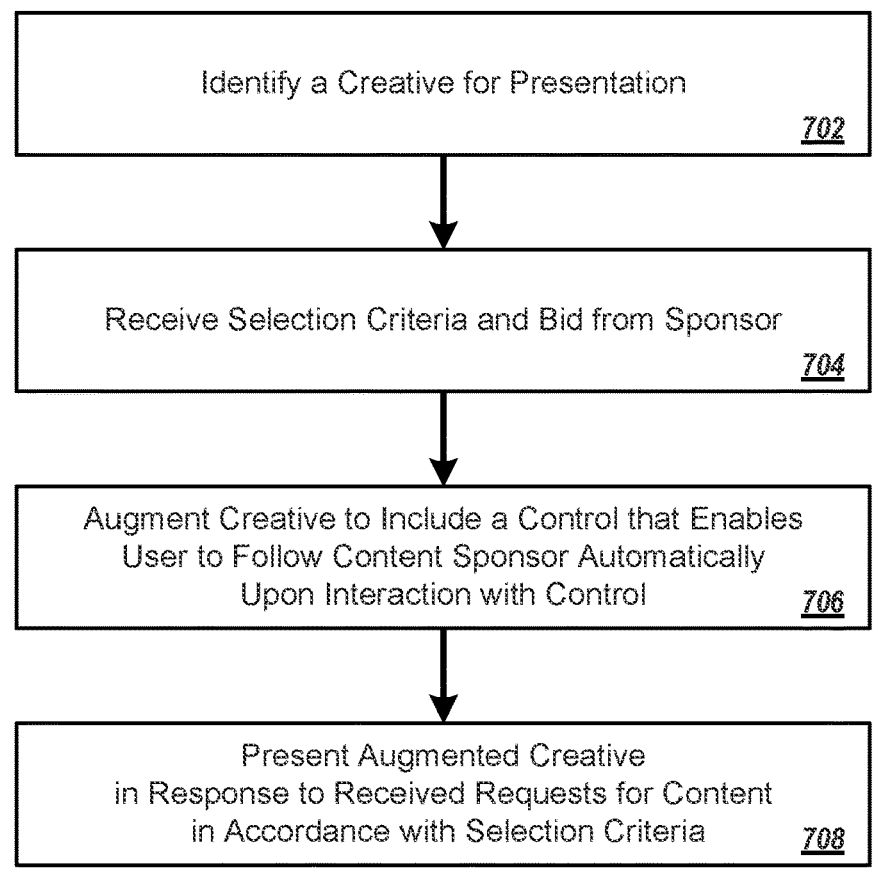
FIGS. 7-10 are flow charts illustrating example processes for facilitating a following of a content sponsor in a social network.

FIG. 7 is a flow chart illustrating an example process 700 for facilitating a following of a content sponsor in a social network. In some implementations, the process 700 may be performed by the systems 100 and/or 200.

A creative can be identified (702) for presentation, in response to requests for content.

Selection criteria and a bid from a sponsor associated with the creative can be received (704). The selection criteria can be used in determining when to present the creative. The bid can be in the form of a cost per follower bid. The sponsor may be charged when the creative is presented and a user initiates an action to follow the sponsor in a social network.

The creative can be augmented (706) to include a control that enables a user to follow the content sponsor automatically upon interaction with the control.

The augmented creative can be presented (708) in response to received requests for content in accordance with the selection criteria.

Figure 8:
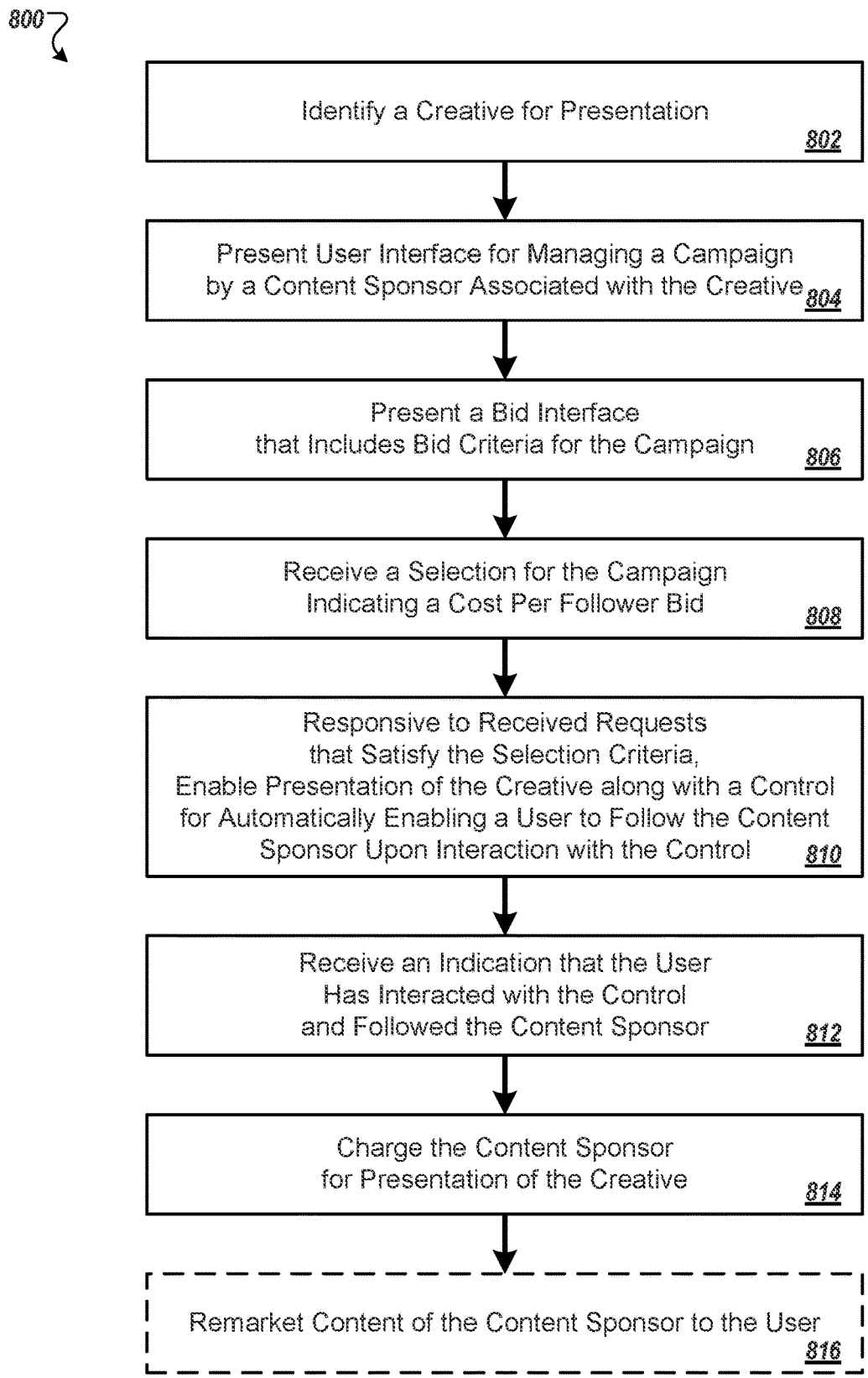

FIG. 8 is a flow chart illustrating an example process 800 for facilitating a following of a content sponsor in a social network. In some implementations, the process 800 may be performed by the systems 100 and/or 200.

A creative can be identified (802) for presentation to users in response to requests for content. The creative may be in the form of an advertisement.

A user interface can be presented (804) for managing a campaign by a content sponsor associated with the creative. Selection criteria for presentation of the creative and a bid can be received through the interface.

A bid interface can be presented (806) that includes bid criteria for the campaign. The bid interface can include a selectable control for specifying a type of bid. The bid types may include cost per impression bids, cost per action bids, and cost per follower bids.

A selection for the campaign can be received (808) indicating a cost per follower bid.

Responsive to received requests that satisfy the selection criteria, the creative can be presented (810) along with a control for automatically enabling a user to follow the content sponsor upon interaction with the control. The user may follow the content sponsor in a social network. Following may result in the user receiving content directly from the content sponsor in the social network.

An indication can be received (812) that the user has interacted with the control and followed the content sponsor. In some implementations, an identify of the user in the social network may be determined and added to a list of followers associated with the content sponsor.

The content sponsor can be charged (814) for the following (e.g., the presentation of the creative and resultant following) in response to receiving the indication in accordance with the bid.

In some implementations, content can be remarketed (816) to the user based on the user being a follower of the content sponsor. Remarketing content may include remarketing content (e.g., advertisements) of the content sponsor to the user. Return on investment information may be provided to the content sponsor, based at least in part on content remarketed to the user, and a cost associated with initially paying for the user to follow the content sponsor.

Figure 9:
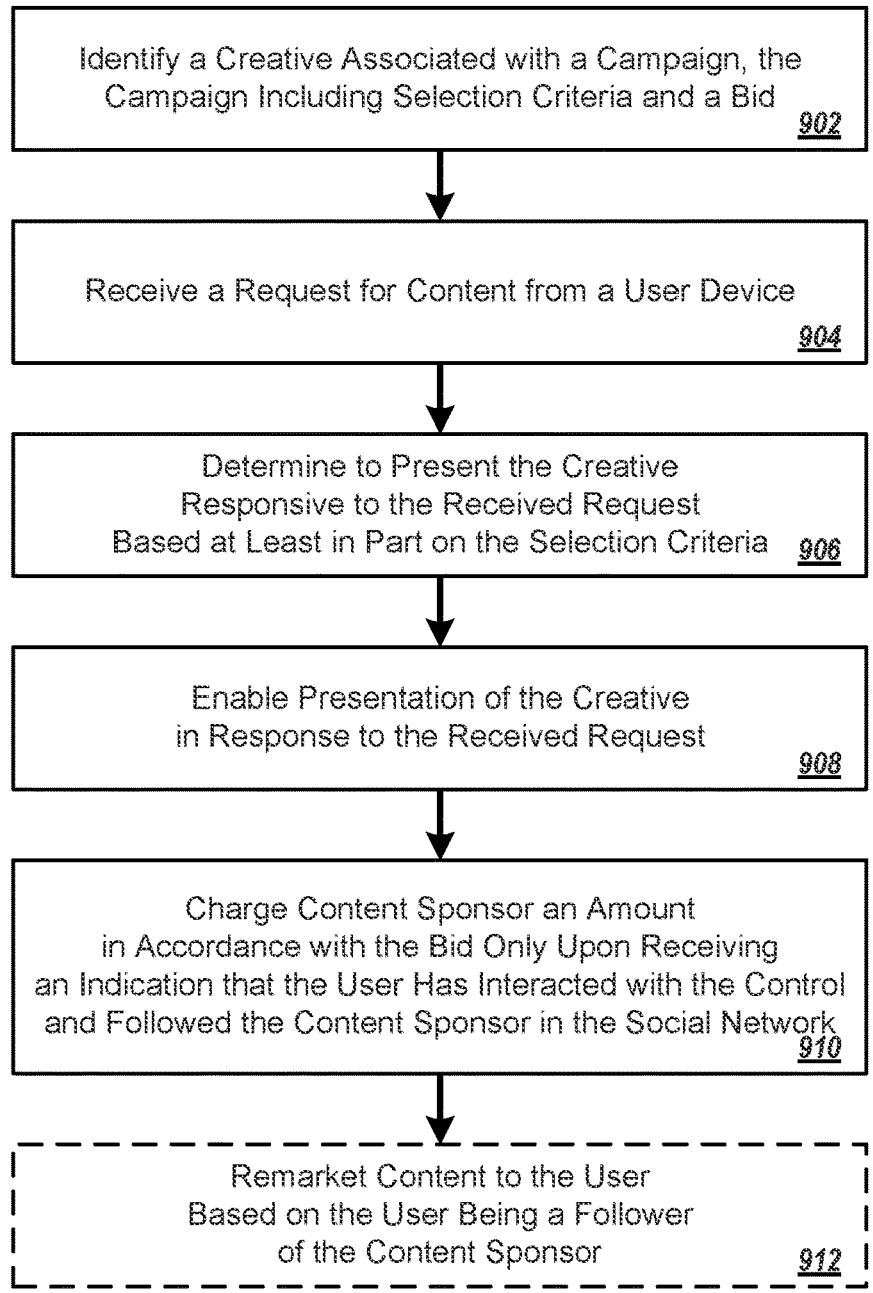

FIG. 9 is a flow chart illustrating an example process 900 for facilitating a following of a content sponsor in a social network. In some implementations, the process 900 may be performed by the systems 100 and/or 200.

A creative (e.g., an advertisement) associated with a campaign can be identified (902). The creative can have associated selection criteria and a bid. The selection criteria can be used in determining when to present the creative in response to requests for content. The creative can include a control to enable a user to follow a content sponsor of the creative in a social network.

A request for content can be received (904) from a user device.

A determination (906) of whether to present the creative responsive to the received request can be made based at least in part on the selection criteria.

Presentation of the creative can be enabled (908) in response to the received request.

The content sponsor can be charged (910) an amount in accordance with the bid, only upon receiving an indication that the user has interacted with the control and followed the content sponsor in the social network.

In some implementations, an identity of the user in the social network may be determined so as to enable the addition of the user to the list of followers associated with the content sponsor in the social network.

In some implementations, content may be remarketed (912) to the user, based on the user being a follower of the content sponsor. Remarketing content may include remarketing content of the content sponsor or other content providers. Return on investment information may be provided to the content sponsor, based at least in part on content remarketed to the user, and a cost associated with initially paying for the user to follow the content sponsor.

Figure 10:
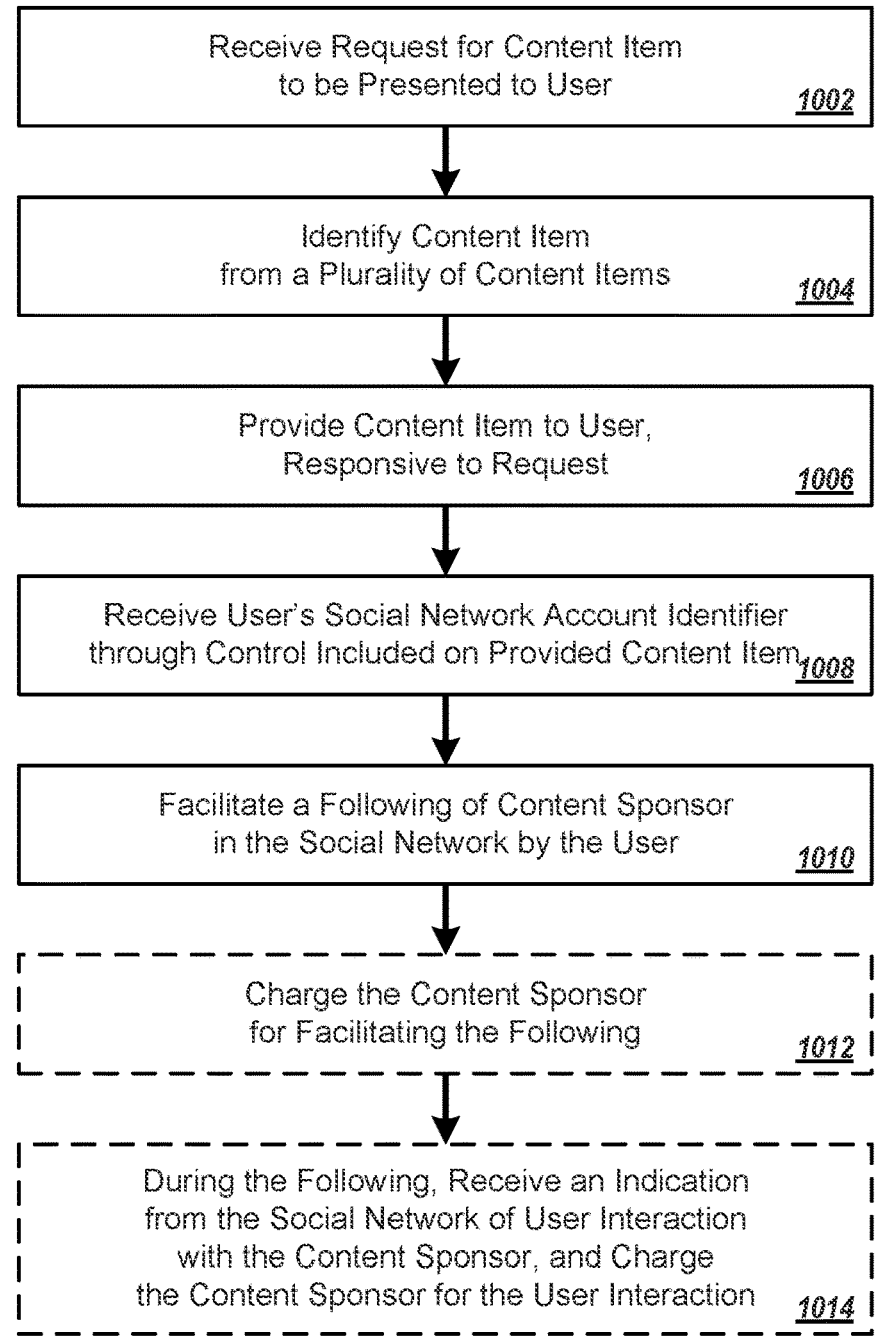

FIG. 10 is a flow chart illustrating an example process 1000 for facilitating a following of a content sponsor in a social network. In some implementations, the process 1000 may be performed by the systems 100 and/or 200.

A request for a content item (e.g., an advertisement) to be presented to a user can be received (1002).

The content item can be identified (1004) from a plurality of content items. The content item can be associated with a content sponsor, and can include a control for receiving an account identifier for a social network associated with a viewer who interacts with the content item. The content sponsor may be an advertiser, the content item may be an advertisement, and the advertisement may be part of a campaign.

In some implementations, identifying the content item may be based at least in part on determining that the user is a member of the social network.

In some implementations, identifying the content item may be based at least in part on determining that the user is likely to be interested in the content sponsor.

In some implementations, an incentive may be provided to the user for providing his or her account identifier, or otherwise indicating an intention to follow the content sponsor.

The content item can be provided (1006) to the user responsive to the request. The content item provided can include a control for enabling the following.

The user's account identifier for the social network can be received (1008) through the control.

In some implementations, the account identifier for the social network may be provided by the user.

In some implementations, a determination may be made of whether the user is logged into the social network, and permission may be received from the user through the content item to facilitate a following of the content sponsor in the social network by the user. The content item can include a control for automatically entering the account identifier for the social network, based on determining that the user is logged into the social network.

A following by the user can be facilitated (1010) of the content sponsor in the social network.

In some implementations, the content sponsor may be charged (1012) for facilitating the following of the content sponsor in the social network.

In some implementations, during the following, an indication may be received (1014) from the social network of user interaction with the content sponsor, and the content sponsor may be charged for the user interaction. The user interaction may include a user message to the content sponsor, an indication of approval of content posted to the social network by the content sponsor, a reposting or forwarding of content posted to the social network by the content sponsor, or a posting of content related to content posted to the social network by the content sponsor.

In some implementations, a campaign parameter may be received for pricing distribution of an advertisement based on an amount that will be paid by the advertiser per follower that is signed up responsive to delivery of the advertisement.

Figure 11:
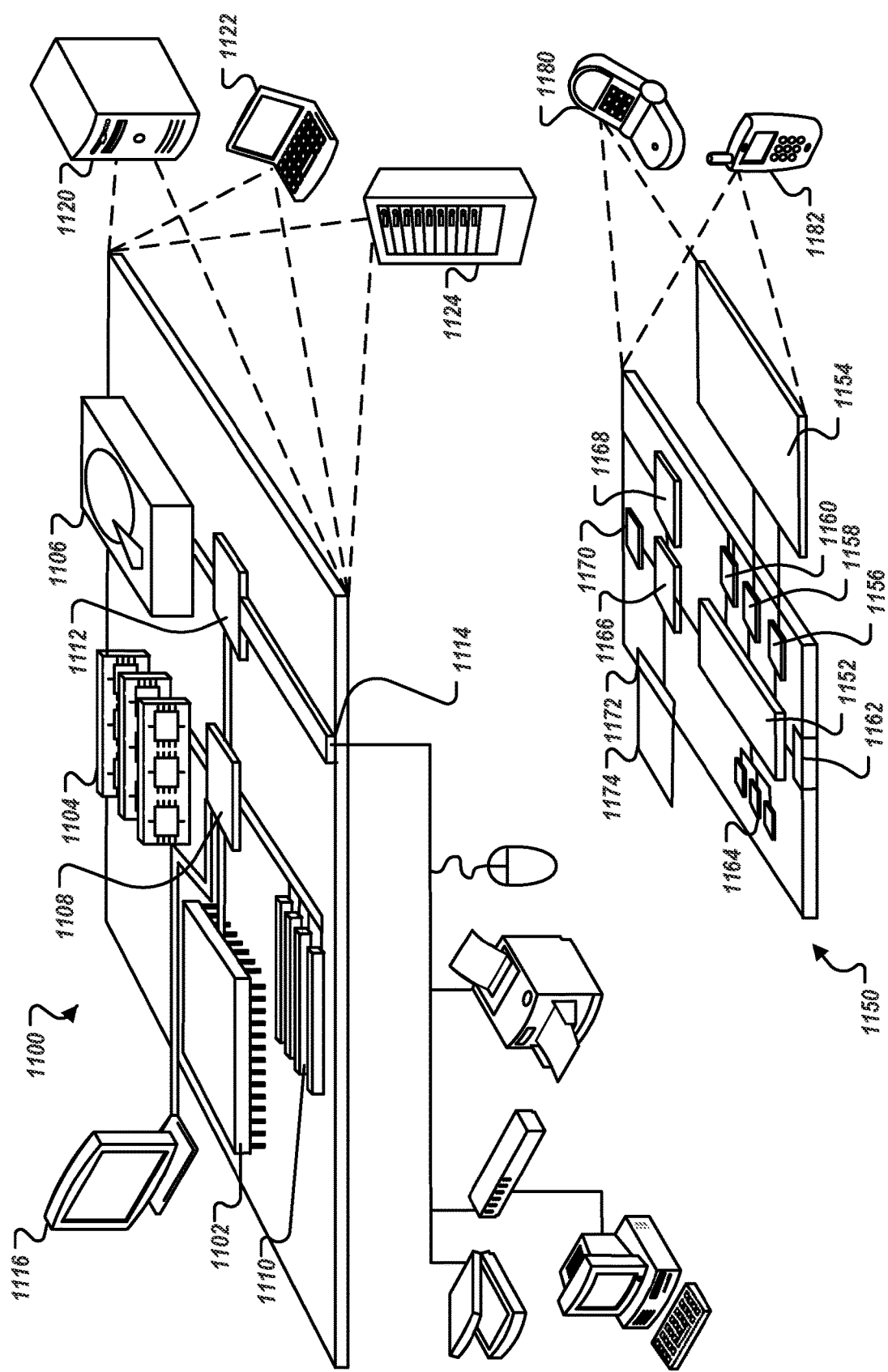
FIG. 11 shows an example of a generic computer device and a generic mobile computer device.

FIG. 11 shows an example of a generic computer device 1100 and a generic mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 may process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 1104, the storage device 1106, memory on processor 1102, or a propagated signal.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 may execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 may be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, memory on processor 1152, or a propagated signal that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    obtaining content for distribution to client devices
    augmenting, by a first server, the content to include a control that adds a user as a follower of an entity in a social network automatically upon interaction with the control that is included in the augmented content, wherein the control is configured to receive an indication of a user intention to follow the entity within the social network without navigating a client device to the social network, the indication of the user intention being provided by the user using the client device, and a social network account identifier of the user being automatically provided by the client device of the user in response to the control receiving the indication of the user intention;
    transmitting, by the first server over a network and to a second server that differs from the first server, the augmented content for presentation within a resource that is provided to the client device by the second server;
    determining, by the first server, that the user has interacted with the control included in the augmented content while the augmented content is presented within the resource at the client device based on interaction information transmitted by the client device to the first server, and determining that the user of the client device is logged into the social network;

transmitting, by the first server and to a social network server that differs from the first server and the second server, a request that the social network server perform an update that adds the user as a follower of the entity within the social network based on the determination that the user has interacted with the control included in the augmented content presented within the resource at the client device and without requiring the client device to navigate to the social network;

adding, by the social network server and without requiring the client device to navigate to the social network, the user as a follower of the entity in the social network, based on the request by the first server that the social network server perform the update; and transmitting, from the social network server and to the client device, information posted to the social network by the entity based on the user being added as a follower of the entity in the social network.

2. The method of claim 1, further comprising: responsive to determining, by the first server, that the control included in the augmented content has been interacted with (i) determining an identity, in the social network, of the user that interacted with the augmented content presented in the resource provided by the second server, and (ii) providing, by the first server to a computing device of the entity, the identity of the user in the social network to enable the user to be included in a list of users who have chosen to follow the entity in the social network.

3. The method of claim 1, further comprising:
determining, by the social network server, that interaction with the information posted to the social network server by the entity and transmitted from the social network server to the client device has occurred; and
responsive to determining that the interaction with the posted information occurred, transmitting, from the social network server and to the first server, a notification that the interaction with the posted information occurred.

4. The method of claim 3, wherein the notification informs the first server that interaction, by the user, with an approval control occurred for indicating approval of the information posted to the social network server by the entity.

5. The method of claim 3, wherein the notification informs the first server that the user has interacted with a reposting control for reposting or forwarding the information posted to the social network server by the entity.

6. The method of claim 3, wherein the notification informs the first server that the user has interacted with a posting control for posting additional information related to the information posted to the social network server by the entity.

7. The method of claim 3, wherein the notification informs the first server that the user has navigated to a web page of the entity outside of the social network.

8. The method of claim 3, further comprising: based on receiving, by the first server and from the social network server, multiple notifications that users have interacted with the posted information (i) determining, by the first server, aggregated user interaction information based on the multiple notifications, and (ii) transmitting, from the first server to a computing device of the entity, the aggregated user interaction information.

9. The method of claim 1, wherein the augmented content is transmitted by the first server over the network and to the second server in response to a request for content for the client device, the request for content being received by the first server and from the second server.

10. The method of claim 1, wherein the augmented content displays identifiers of one or more other users who are followers of the entity in the social network.

11. The method of claim 1, wherein the augmented content is provided by the first server when the user of the client device is identified as being a member of the social network.

12. The method of claim 1, wherein the augmented content is provided by the first server when the user of the client device is identified as having followed one or more other entities.

13. The method of claim 1, wherein the augmented content is provided by the first server when the user of the client device is identified as being connected on the social network to one or more other users who have followed the entity.

14. The method of claim 1, wherein after determining that that interaction with the control included in the augmented content while the augmented content is presented within the resource at the client device has occurred, modifying, by the first server, the augmented content with an indication that the user of the client device is a current follower of the entity in the social network.

15. The method of claim 1, further comprising determining that the user of the client device is not logged into the social network, wherein the control that adds the user as a follower of the entity in the social network is configured to receive a social network account identifier of the user, the social network account identifier being entered into the control by the user using the client device without requiring the client device to navigate to the social network.

16. The method of claim 1, wherein transmitting the request that the social network server perform the update that adds the user as a follower of the entity within the social network includes the first server using an application programming interface provided by the social network server.

17. The method of claim 1, wherein transmitting information posted to the social network by the entity from the social network server and to the client device includes adding posts from the entity to a timeline of the user.

18. A computer system comprising:
a first server including one or more processors;
a second server including one or more processors;
a social network server including one or more processors, wherein the first server, the second server, and the social network server are each different servers; and
one or more data stores storing instructions that, when executed cause performance of operations comprising:
obtaining content for distribution to client devices
augmenting, by the first server, the content to include a control that adds a user as a follower of an entity in a social network automatically upon interaction with the control that is included in the augmented content, wherein the control is configured to receive an indication of a user intention to follow the entity within the social network without navigating a client device to the social network, the indication of the user intention being provided by the user using the client device, and a social network account identifier of the user being automatically provided by the client device of the user in response to the control receiving the indication of the user intention;
transmitting, by the first server over a network and to the second server that differs from the first server, the augmented content for presentation within a resource that is provided to the client device by the second server;

determining, by the first server, that the user has interacted with the control included in the augmented content while the augmented content is presented within the resource at the client device based on interaction information transmitted by the client device to the first server, and determining that the user of the client device is logged into the social network;

transmitting, by the first server and to the social network server that differs from the first server and the second server, a request that the social network server perform an update that adds the user as a follower of the entity within the social network based on the determination that the user has interacted with the control included in the augmented content presented within the resource at the client device and without requiring the client device to navigate to the social network;

adding, by the social network server and without requiring the client device to navigate to the social network, the user as a follower of the entity in the social network, based on the request by the first server that the social network server perform the update; and transmitting, from the social network server and to the client device, information posted to the social network by the entity based on the user being added as a follower of the entity in the social network.

19. A non-transitory computer readable medium comprising instructions that, when executed cause a performance of operations comprising:

obtaining content for distribution to client devices augmenting, by a first server, the content to include a control that adds a user as a follower of an entity in a social network automatically upon interaction with the control that is included in the augmented content, wherein the control is configured to receive an indication of a user intention to follow the entity within the social network without navigating a client device to the social network, the indication of the user intention being provided by the user using the client device, and a social network account identifier of the user being automatically provided by the client device of the user in response to the control receiving the indication of the user intention;

transmitting, by the first server over a network and to a second server that differs from the first server, the augmented content for presentation within a resource that is provided to the client device by the second server;

determining, by the first server, that the user has interacted with the control included in the augmented content while the augmented content is presented within the resource at the client device based on interaction information transmitted by the client device to the first server, and determining that the user of the client device is logged into the social network;

transmitting, by the first server and to a social network server that differs from the first server and the second server, a request that the social network server perform an update that adds the user as a follower of the entity within the social network based on the determination that the user has interacted with the control included in the augmented content presented within the resource at the client device and without requiring the client device to navigate to the social network;

adding, by the social network server and without requiring the client device to navigate to the social network, the user as a follower of the entity in the social network, based on the request by the first server that the social network server perform the update; and transmitting, from the social network server and to the client device, information posted to the social network by the entity based on the user being added as a follower of the entity in the social network.

* * * * *